(12) United States Patent
Andrews

(10) Patent No.: US 6,792,320 B2
(45) Date of Patent: Sep. 14, 2004

(54) REMOTE CHANGE OF STATE FOR LABORATORY EQUIPMENT

(75) Inventor: Craig C. Andrews, College Station, TX (US)

(73) Assignee: Fideris, Inc., College Station, TX (US)

( * ) Notice: Subject to any disclaimer, the term of this patent is extended or adjusted under 35 U.S.C. 154(b) by 690 days.

(21) Appl. No.: 09/774,390

(22) Filed: Jan. 30, 2001

(65) Prior Publication Data

US 2002/0103550 A1 Aug. 1, 2002

(51) Int. Cl.$^7$ ............................................. G05B 19/18
(52) U.S. Cl. ....................................... 700/65; 700/275
(58) Field of Search ............................. 700/1–3, 11, 12, 700/65, 66, 275–277, 282

(56) References Cited

U.S. PATENT DOCUMENTS

| | | | | |
|---|---|---|---|---|
| 5,316,869 A | * | 5/1994 | Perry et al. | 429/19 |
| 5,512,831 A | | 4/1996 | Cisar et al. | 324/426 |
| 5,764,579 A | * | 6/1998 | McMasters et al. | 700/2 |
| 5,841,975 A | * | 11/1998 | Layne et al. | 709/203 |
| 5,969,514 A | * | 10/1999 | Merrill | 323/283 |
| 6,269,299 B1 | * | 7/2001 | Blotenberg | 701/100 |
| 6,311,105 B1 | * | 10/2001 | Budike, Jr. | 700/291 |
| 6,324,042 B1 | * | 11/2001 | Andrews | 361/93.2 |
| 6,522,955 B1 | * | 2/2003 | Colborn | 700/286 |
| 6,697,245 B2 | * | 2/2004 | Andrews | 361/93.2 |
| 2002/0103550 A1 | * | 8/2002 | Andrews | 700/65 |

* cited by examiner

*Primary Examiner*—Maria N. Von Buhr
(74) *Attorney, Agent, or Firm*—Streets & Steele; Jeffrey L. Streets; Frank J. Campigotto

(57) ABSTRACT

A method and apparatus for remotely controlling a laboratory process operated by a controller. The remote control signal may originate from any one or more sensor that detects information that is relevant to the operation and control of a given laboratory process. Examples of sensors that could originate remote control signals include, but are not limited to, building smoke alarms, toxic gas monitors, and handheld remotes carried by laboratory technicians. A receiver communicates the change of state commands to the laboratory process, preferably to a programmable controller operating the laboratory process, directly to the laboratory process, or a combination thereof.

27 Claims, 2 Drawing Sheets

REMOTE CHANGE OF STATE FOR LABORATORY EQUIPMENT

BACKGROUND OF THE INVENTION

1. Field of the Invention

This invention relates to apparatus and methods for controlling laboratory equipment. More particularly, the apparatus and methods provide for manual input or control of a process condition, such as a potentially hazardous condition.

2. Background of the Related Art

Laboratory equipment is apparatus that is used for scientific experimentation, research, or testing and is typically considered to be of a size that can be housed within a room or building. While there are enumerable types, designs, styles and models of laboratory equipment, a large portion of laboratory equipment is capable of producing hazardous conditions if the equipment is misused or malfunctions. Consequently, laboratory technicians that operate the equipment must be well trained to operate and maintain the equipment under a variety of conditions and uses. Many equipment designs include built-in safety features that prevent or assist in managing hazardous, harmful or otherwise undesirable conditions.

For many laboratory processes, it is important to prevent hazardous conditions from getting out of control. In other words, the nature of much laboratory equipment or processes, and the materials used in association with the laboratory processes, is that the conditions can be managed within certain limits, but it is necessary to interrupt the normal progress of the process if the conditions go beyond those limits. One way to interrupt the process includes the use of manual controls and on/off switches or valves by a laboratory technician having identified the hazardous condition. However, manual control requires the continuous attention of the technician. A generally more effective way to interrupt the process is through the use of programmable controllers in communication with any of a variety of sensors that convert the magnitude of a given process condition into an electronic signal. By appropriately programming the controller to identify hazardous conditions, it is possible for the controller to continuously monitor for hazardous conditions and interrupt the process as appropriate.

However, despite the additional capabilities provided by programmable controllers, there are typically at least a few process and external conditions that the programmable controller was not designed to observe or consider. Examples of important conditions that the controller may not be equipped to detect include, but are not limited to, status of maintenance work such as the electrical supply to the lab, the status of support equipment such as process gas supplies, fluid leaks, and the like. Therefore, it is important that the technician retain ultimate control over the process, especially while the process is experiencing a hazardous condition.

While technician control of the hazardous condition is optimal for the sake of process control, there may be an overriding personal safety interest causing the technician to evacuate the lab. Therefore, there is a need for a process control system that enables technician control over certain critical process parameters during a hazardous condition without subjecting the technician to the risks of exposure to the hazardous condition. It would be desirable if the process control system could be retrofitted onto a variety of laboratory equipment.

SUMMARY OF THE INVENTION

The present invention provides a method for remotely controlling laboratory equipment operated by a controller. The method comprises: providing one or more change of state commands from a remote transmitter, wherein the one or more change of state commands are selected from controller change of state commands, hardware change of state commands, or a combination thereof; receiving the one or more change of state commands at a receiver in electronic communication with the controller and the laboratory equipment; communicating controller change of state commands from the receiver to the controller instructing the controller to execute one or more steps to change the state of the laboratory equipment; and communicating hardware change of state commands from the receiver directly to the laboratory equipment. Optionally, the controller may be selected from a microprocessor, sequencing relays, state machines, programmable logic controller, distributed control system, and combinations thereof. Preferably, the hardware change of state commands are communicated directly to critical components of the laboratory equipment without passing through the controller. For example, the hardware change of state command may be communicated through a holding coil, wherein the holding coil is released upon receiving a hardware change of state command. The method may further comprise executing, using the controller, another step in response to each controller change of state command received by the controller. Exemplary change of state commands are selected from shutdown commands, standby commands, reset commands, and combinations thereof.

The invention also provides a system for remotely controlling laboratory equipment operated by a controller. The system comprises: a handheld remote transmitter capable of transmitting one or more change of state commands; a receiver in electronic communication with the controller and in electronic communication with the laboratory equipment; wherein the receiver directs the one or more change of state commands to the controller to execute a next step in a sequence of steps controlling the laboratory equipment. The one or more change of state commands may be selected from hardware change of state commands and controller change of state commands. The receiver may relay hardware change of state commands directly to the laboratory equipment and relay controller change of state commands to the controller. In one embodiment, the system further comprises a holding coil in electromagnetic communication with one or more control element, such as a valve or switch, that is a part of the laboratory equipment, such that a hardware change of state command relayed to the holding coil releases the holding coil and closes the valve.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
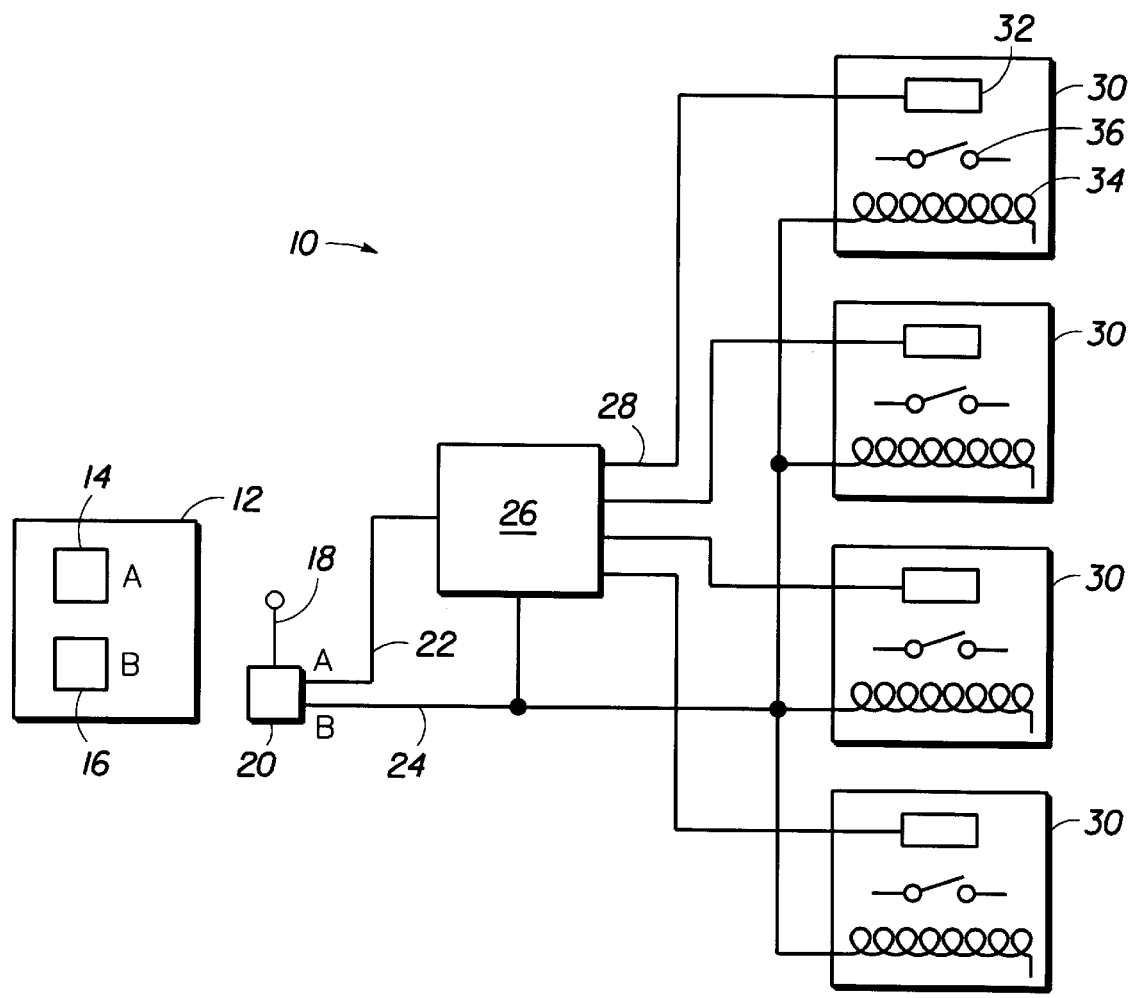
FIG. 1 is a schematic diagram of a process control system of the present invention.

The present invention provides a method and apparatus for remotely controlling a laboratory process operated by a controller. The remote control signal may originate from any one or more sensor that detects information that is relevant to the operation and control of a given laboratory process. Examples of sensors that could originate remote control signals include, but are not limited to, building smoke alarms, toxic gas monitors, and handheld remotes carried by laboratory technicians. While it may be necessary to add transmitters or electrical wires to these sensors in order for them to communicate with a laboratory process or controller, such modifications may be easily accomplished.

A sensor may be made to communicate with one or more laboratory processes and each laboratory process may have a programmable controller that provides a customized response to the control signal received. Furthermore, the signal-generating device may even be a second stand-alone laboratory process so that a process condition of the second process can be communicated to the first process. For example, a gas leak from the second process is detected and communicated to the first process that responds by shutting off an ignition source. The present invention includes communication of the remote control signal by any known communication medium, such as radio waves, light waves, and electronically conducting wire.

In one embodiment, the remote controller preferably uses a mobile wireless transmitter so that the laboratory technician can carry the transmitter and provide change of state commands to the laboratory equipment as soon as conditions warranting such change of state are recognized by the technician. A receiver communicates the change of state commands to the laboratory equipment, preferably to a programmable controller operating the laboratory equipment ("controller change of state commands"), directly to the laboratory equipment ("hardware change of state commands"), or a combination thereof. The controller change of state commands may include, but are not limited to, instructions for the control program to jump to a special set of instructions such as a special shutdown routine, instructions for the control program to increment to the next step in a sequence of steps, and the like. The hardware change of state commands may include, but are not limited to, switching on/off power or other inputs to the laboratory process, opening/closing a valve or other device that forms part of the laboratory process, and the like. It should be recognized that any of the signal-generating devices disclosed herein could communicate a controller change of state command, a hardware change of state command or both, depending upon the type or severity of condition detected.

While the present method and apparatus may be used for commanding any change of state, a preferred embodiment utilizes the method and apparatus to handle hazardous or undesirable conditions. In one preferred embodiment, the sensor or remote controller can transmit at least two signals that the receiver can distinguish as being a change of state command for either the controller or the hardware associated with the laboratory process. The at least two signals can be digital or analog and can be two identifiable signals on the same channel or signals on two separate channels, wherein a channel may be distinguished by a particular frequency.

The invention includes semiautomatic shutdowns, where a certain condition is measured or detected and compared with an alarm set point that, if the set point is exceeded, sets of an alarm, such as a horn, light or display. If the technician does not respond within a set point period of time, by using either a direct input to the controller or a remote shutdown command, then the system will perform a shutdown.

FIG. 1 is a schematic diagram of a process control system 10 of the present invention. A remote control unit 12 having one or more channels 14,16 transmits information via radio waves, light, etc., to a receiver 18, which information is decoded by a receiver station 20 into two or more signals A and B shown as 22 and 24, respectively. Channel A is in communication to the primary process control system 26 that is performing a sequence of steps as programmed by the user or through direct user interface. This control system 26 is, in turn, in communication 28 with one or more testing subsystems 30 each having an internal control system 32 which may be a combination of software and hardware control of the various functions and monitoring capabilities of the subsystem 30. A second channel B, 6 is in direct communication with individual subsystems 30 as well as the primary controller 26. Signal B represents a hardware change of state command involving minimal use, if any, of the control system 26 or its software required for completion of the shutdown operation. As an example, this hardware signal B is received by each individual subsystem 30 through a holding coil 34 located in each subsystem 30. When the hardware shutdown signal 24 is received, or by the breaking of a normally closed circuit, each holding coil 34 is released, opening contacts 36 which provide a predetermined and desirable change of state or operation of the subsystem 30.

It should be emphasized that the subsystems 30 may form portions of a single process, such as components of a fuel cell test station, or the subsystems 30 may be entirely separate laboratory processes. In either case, the state of one or more of the subsystems may be changed, for example through a single remote control unit 12, receiver 18,20 and primary controller 26 or hardware device 34. Since a hazardous condition arising from the operation of one laboratory process may effect the operation of other laboratory processes, the system may be implemented to change the state of multiple processes.

Figure 2:
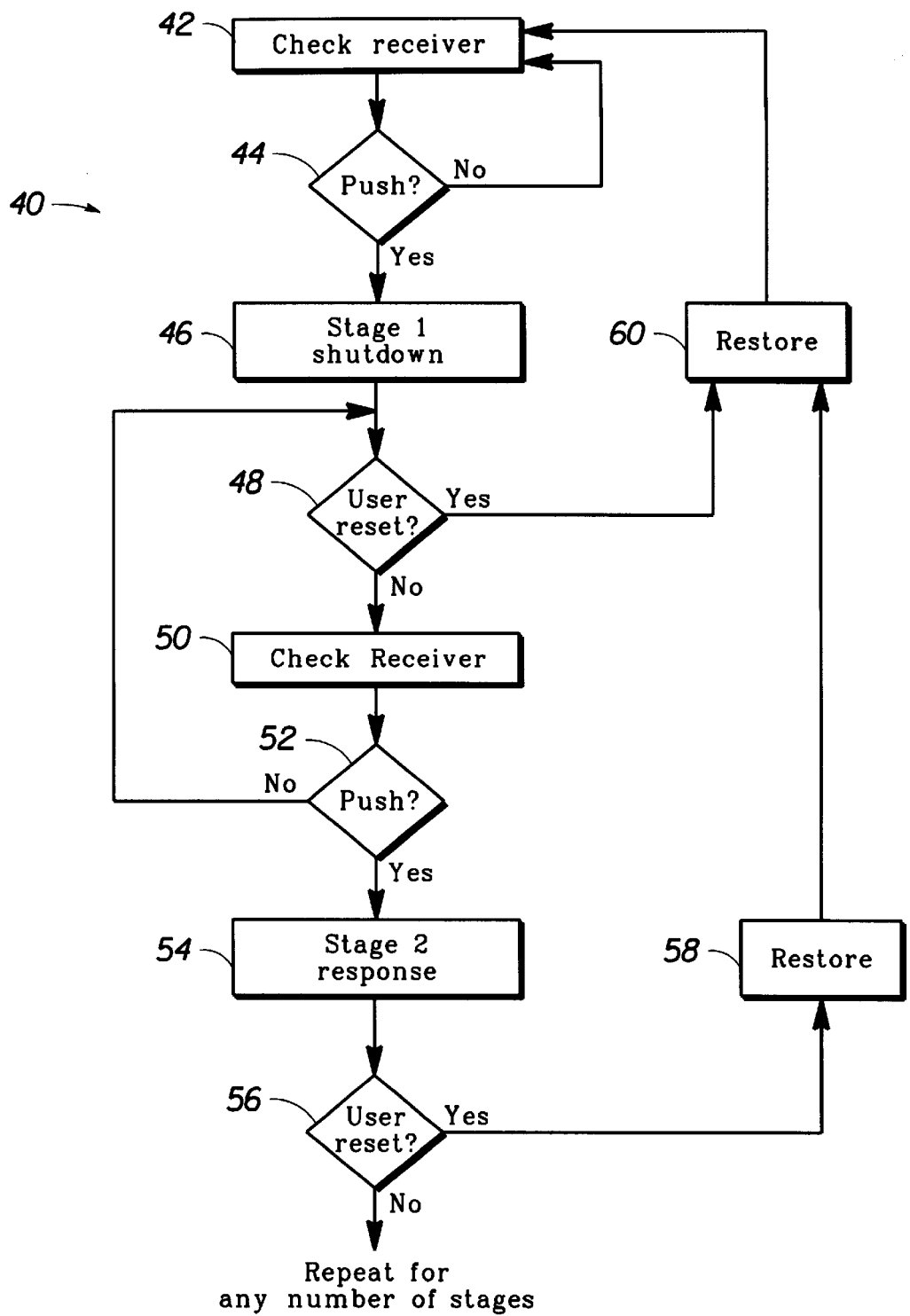
FIG. 2 is logic diagram illustrating the operation of a process control system of the present invention.

FIG. 2 is logic diagram 40 illustrating a software shutdown procedure suitable for use with a process control system of the present invention. In step 42, the control system 26 checks, poles or monitors the receiver 18, 20 for receipt of a signal from the remote 12. In step 44, if a signal has been received then the software executes step 46, but if no signal is received then step 42 is repeated. In step 46, the signal received executes a stage-one shutdown instruction, procedure or subroutine with respect to control of the associated laboratory equipment. In step 48, the control system 26 determines whether or not the receiver has received a "reset" signal. If a "reset" signal has been received, then step 60 is executed to restore the operation of the laboratory equipment. If no "reset" signal has been received, then step 50 instructs the control system 26 to check, pole or monitor the receiver 18, 20 for receipt of a subsequent signal from the remote 12. In step 52, if a signal has been received then the software executes a stage-two shutdown in step 54, but if no signal is received then step 52 returns the program to step 48. Following step 54, step 56 causes the control system 26 to determine whether or not the receiver has received a "reset" signal. If a "reset" signal has been received, then steps 58 and 60 are executed in order to restore operation of the laboratory equipment from the stage-two shutdown condition to the stage one shutdown condition and back to full operation. This pattern of instructions can be repeated for any number of shutdown stages or other changes of state as desired.

An additional safety feature of the present invention provides a quick response to the cooling system of a fuel cell upon receipt of a change of state command or upon detecting the existence of one or more predetermined trigger conditions. Low temperature fuel cells will generally have a means for providing heating/cooling water to the fuel cell, or for small cells maybe just heating water. In the event that there is an over-temperature condition, the controller causes the cooling device to operate at a cooling set point, such as maximum cooling. For example, the controller may take one or more actions selected from turning the heaters off, setting the water recirculation pump to a high flow rate, setting the cooling heat exchanger to maximum cooling, reducing or stopping the flow of reactant gas to the fuel cell, shutting off or turning down the humidifier, or shutting off or turning down the load. A suitable predetermined trigger condition is the temperature of the body or internals of the fuel cell itself, but the preferred trigger condition is the temperature of the gas exiting the fuel cell (tail gas) since this may provide a better indication of the internal temperature of the fuel cell.

Under normal operation of the fuel cell, the actual temperature of the fuel cell can be monitored directly or an average temperature of the fuel cell can be obtained by monitoring the temperature of the cooling water flowing through the cooling plates. When a cross over occurs within the stack, the reactant fuel gas that should be consumed during the electrochemical process generating electricity is now primarily being consumed in a heat generating process as the reactant gases combine on the surface of the catalyst inside the stack. Consequently, monitoring the temperature of the cooling water is unlikely to detect a small cross over since the cooling water has such a large thermal mass that a small amount of heat makes an almost undetectable increase in temperature. In addition, the cross over will generate the heat in the gas near the gas flow system such that the gas stream will experience a faster and greater temperature increase than the stack cooling system. Therefore, a cross over is most easily detected by a spike or significant increase in the temperature of the gas stream exiting the fuel cell. A tail gas temperature-measuring device is positioned in the gas stream at a position that is inside the fuel cell, at the exit of the fuel cell, or at the entrance of the fuel cell test station. The test station control system monitors the tail gas temperature and identifies any abnormal increase in temperature. The control system may then set an alarm flag and/or initiate steps to put the operation in a safe state, such as by shutting down the system.

If the gas from the crossover is not combined and reacted inside the cell or stack to cause a temperature increase, the gases may cross over (either fuel into the oxidant or oxidant into the fuel) and exit the stack without reacting. A cross over without an immediate reaction produces a condition where the pure fuel stream contains an oxidant or the oxidant stream contains a fuel. Under normal conditions either of the two separate reactant tail gas streams (fuel or oxidant) can be passed over an active catalyst without reacting. However, if there is a cross over, this mixed gas stream will be highly reactive across the proper surface and most likely the reaction will release substantial heat.

A cross over detector suitable for detecting this mixed gas stream may be prepared by placing two temperature sensors in the gas stream with each sensor having a heating element in thermal contact with the sensor, but only one of the sensors having a catalyst deposited on its surface for reacting any available fuel with any available oxidant. The detectors are maintained at a constant temperature by their individual heating elements, despite the gas flow past the sensors withdrawing heat from the sensor. The amount of power required to maintain the constant temperature is measured. If there is a mixture of gases in the gas stream, then the temperature of the catalyst-coated probe will increase due to the exothermic reaction. In other words, the catalyzed sensor will require less power to maintain the sensor at a constant temperature as compared to the uncatalyzed reference sensor. As a result, the amount of power required to maintain each of the probes at a given temperature is monitored, and if the catalyst-coated probe is observed to require less thermal input to maintain temperature it is an indication that a mixed gas (both a fuel and oxidant) is passing the detector and reacting on the catalyst coated surface.

While the foregoing is directed to the preferred embodiment of the present invention, other and further embodiments of the invention may be devised without departing from the basic scope thereof, and the scope thereof is determined by the claims that follow.

What is claimed is:

1. A method for remotely controlling a laboratory process that includes a fuel cell and that is operated by a controller, comprising:
   transmitting a safe state command from a device that is not part of the fuel cell, wherein the safe state command is selected from a controller safe state command, a hardware safe state command, or a combination thereof;
   receiving the safe state command at a receiver in electronic communication with the controller and the laboratory process;
   communicating controller safe state commands from the receiver to the controller instructing the controller to execute one or more steps to improve the safe state of the laboratory process; and
   communicating hardware safe state commands from the receiver directly to the laboratory process.

2. The method of claim 1, wherein the safe state command is a standby command or a shutdown command.

3. The method of claim 1, wherein the controller operating the fuel cell is part of a fuel cell test station.

4. The method of claim 1, wherein the one or more steps executed by the controller to improve the safe state of the laboratory process are selected from removing a load from the fuel cell, reducing or shutting off the flow of fuel to the fuel cell, reducing or shafting off the flow of oxidant to the fuel cell, purging reactant gases from the fuel cell, increasing the rate of cooling the fuel cell, and relieving backpressure on the fuel cell.

5. The method of claim 1, wherein the controller is selected from a microprocessor, sequencing relays, state machines, programmable logic controller, distributed control system, and combinations thereof.

6. The method of claim 3, wherein the hardware safe state commands are communicated directly to critical components of the fuel coil test station.

7. The method of claim 1, further comprising:
   executing, using the controller, another step in response to each controller safe state command received by the controller.

8. The method of claim 1, wherein the safe state commands are selected from shutdown commands, standby commands, reset commands, and combinations thereof.

9. The method of claim 3, wherein the hardware safe state commands are communicated to the fuel cell test station through a holding coil.

10. The method of claim 9, further comprising:
    releasing the holding coil upon receiving a hardware safe state command.

11. A system for remotely controlling operation of a fuel cell test station, comprising:

a handheld remote transmitter capable of transmitting one or more change of state commands to the fuel cell test station, wherein the fuel cell test station has a controller and a plurality of process control devices;

a receiver in electronic communication with the controller and in electronic communication with the process control devices;

wherein the receiver directs the one or more change of state commands to the controller to execute a next step in a sequence of steps controlling the process control devices.

12. The system of claim 11, wherein the one or more change of stare commands are selected from hardware change of state commands and controller change of state commands.

13. The system of claim 12, wherein the receiver relays hardware change of state commands directly to the process control devices and relays controller change of state commands to the controller.

14. The system of claim 13, further comprising:

a holding coil in electromagnetic communication with one or more control elements that is a part of laboratory equipment used in the laboratory process.

15. A method for remotely controlling a laboratory process operated by a controller, comprising:

transmitting one or more change of state commands from a sensor that is not part of the laboratory process, wherein the one or more change of state commands are selected from controller change of state commands, hardware change of state commands, or a combination thereof;

receiving the one or more change of state commands at a receiver in electronic communication with the controller and the laboratory process;

communicating controller change of state commands from the receiver to the controller instructing the controller to execute one more steps to change the state of the laboratory process; and communicating hardware change of state commands from the receiver directly to the laboratory process.

16. The method of claim 15, wherein the controller is selected from a microprocessor, sequencing relays, state machines, programmable logic controller, distributed control system, and combinations thereof.

17. The method of claim 15, wherein the hardware change of state commands are communicated directly to critical equipment components of the laboratory process.

18. The method of claim 15, further comprising:

executing, using the controller, another step in response to each controller change of state command received by the controller.

19. The method of claim 15, wherein the change of state commands are selected from shutdown commands, standby commands, reset commands, and combinations thereof.

20. The method of claim 15, wherein the hardware change of state commands are communicated to laboratory equipment that is a part of the laboratory process through a holding coil.

21. The method of claim 20, further comprising:

releasing the holding coil upon receiving a hardware change of state command.

22. A system for remotely controlling laboratory equipment operated by a controller, comprising:

a handheld remote transmitter capable of transmitting one or more change of state commands;

a receiver in electronic communication with the controller and in electronic communication with the laboratory equipment;

wherein the receiver directs the one or more change of state commands to the controller to execute a next step in a sequence of steps controlling the laboratory equipment.

23. The system of claim 22, wherein the one or more change of state commands are selected from hardware change of state commands and controller change of state commands.

24. The system of claim 23, wherein the receiver relays hardware change of state commands directly to the laboratory equipment and relays controller change of state commands to the controller.

25. The system of claim 24, further comprising:

a holding coil in electromagnetic communication with one or more control elements that is a part of the laboratory equipment.

26. The system of claim 25, wherein the one or more control elements is selected from valves, switches, and combinations thereof.

27. The system of claim 25, wherein the one or more control elements comprise a solenoid valve, and wherein a hardware change of state command relayed to the holding coil releases the holding coil and closes the valve.

* * * * *